US012731585B2

(12) United States Patent
Sharifi et al.

(10) Patent No.: US 12,731,585 B2
(45) Date of Patent: Sep. 8, 2026

(54) WARM WORD ARBITRATION BETWEEN AUTOMATED ASSISTANT DEVICES

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 57 days.

(21) Appl. No.: 18/900,099

(22) Filed: Sep. 27, 2024

(65) Prior Publication Data

US 2025/0022464 A1 Jan. 16, 2025

Related U.S. Application Data

(63) Continuation of application No. 17/573,418, filed on Jan. 11, 2022, now Pat. No. 12,106,755.

(Continued)

(51) Int. Cl.

*G10L 15/22* (2006.01)
*G10L 15/30* (2013.01)
*G10L 15/32* (2013.01)

(52) U.S. Cl.

CPC .............. *G10L 15/22* (2013.01); *G10L 15/30* (2013.01); *G10L 15/32* (2013.01)

(58) Field of Classification Search

CPC .......... G10L 15/22; G10L 15/30; G10L 15/32
See application file for complete search history.

(56) References Cited

U.S. PATENT DOCUMENTS

2015/0019219 A1 1/2015 Tzirkel-Hancock
2017/0345422 A1* 11/2017 Yang ...................... G06F 3/167

(Continued)

FOREIGN PATENT DOCUMENTS

EP 3819728 5/2021
JP 2017227912 12/2017

(Continued)

OTHER PUBLICATIONS

European Patent Office, Intention to Grant issued in Application No. 22847029.0; 50 pages; dated Mar. 11, 2025.

(Continued)

*Primary Examiner* — Brian L Albertalli
(74) *Attorney, Agent, or Firm* — Gray Ice Higdon

(57) ABSTRACT

Techniques are described herein for warm word arbitration between automated assistant devices. A method includes: determining that warm word arbitration is to be initiated between a first assistant device and one or more additional assistant devices, including a second assistant device; broadcasting, by the first assistant device, to the one or more additional assistant devices, an active set of warm words for the first assistant device; for each of the one or more additional assistant devices, receiving, from the additional assistant device, an active set of warm words for the additional assistant device; identifying a matching warm word included in the active set of warm words for the first assistant device and included in the active set of warm words for the second assistant device; and enabling or disabling detection of the matching warm word by the first assistant device, in response to identifying the matching warm word.

20 Claims, 4 Drawing Sheets

Related U.S. Application Data

(60) Provisional application No. 63/291,127, filed on Dec. 17, 2021.

(56) References Cited

U.S. PATENT DOCUMENTS

| | | | | |
|---|---|---|---|---|
| 2018/0108351 | A1 | 4/2018 | Beckhardt et al. | |
| 2019/0378504 | A1* | 12/2019 | Bender .............. | G06K 19/0723 |
| 2020/0234708 | A1 | 7/2020 | Beckhardt | |
| 2020/0395006 | A1 | 12/2020 | Smith et al. | |
| 2021/0256967 | A1 | 8/2021 | Iacobelli | |
| 2022/0215837 | A1 | 7/2022 | White | |
| 2023/0169956 | A1 | 6/2023 | D'Amato | |
| 2023/0197072 | A1 | 6/2023 | Sharifi et al. | |
| 2023/0215424 | A1 | 7/2023 | John | |
| 2023/0393811 | A1 | 12/2023 | Piersol | |

FOREIGN PATENT DOCUMENTS

| | | |
|---|---|---|
| JP | 2019207710 | 12/2019 |
| WO | 0021075 | 4/2000 |
| WO | 2016085776 | 6/2016 |

OTHER PUBLICATIONS

European Patent Office; International Search Report and Written Opinion issued in Application No. PCT/US2022/052296; 10 pages; dated Apr. 25, 2023.

Intellectual Property India, Examination Report issued in Application No. 202417039569, 7 pages, dated Apr. 15, 2026.

* cited by examiner

WARM WORD ARBITRATION BETWEEN AUTOMATED ASSISTANT DEVICES

BACKGROUND

Humans can engage in human-to-computer dialogs with interactive software applications referred to herein as "automated assistants" (also referred to as "digital assistants", "digital agents", "interactive personal assistants", "intelligent personal assistants", "assistant applications", "conversational agents", etc.). For example, humans (who, when they interact with automated assistants, may be referred to as "users") may provide commands and/or requests to an automated assistant using spoken natural language input (i.e., spoken utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant generally responds to a request by providing responsive user interface output (e.g., audible and/or visual user interface output), controlling one or more smart devices, and/or controlling one or more function(s) of a device implementing the automated assistant (e.g., controlling other application(s) of the device).

An automated assistant may be a software application that executes on a client device. The client device may be a standalone interactive speaker, a standalone interactive display device (which may also include a speaker and/or camera), a smart appliance such as a smart television (or a standard television equipped with a networked dongle with automated assistant capabilities), a desktop computing device, a laptop computing device, a tablet computing device, a mobile phone computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device).

Automated assistants typically rely upon a pipeline of components in processing user requests. For example, a hotword detecting engine can be used to process audio data by monitoring for occurrence of a spoken hotword (wake word) (e.g., "OK Assistant") and, in response to detecting the occurrence, cause processing by other component(s) to take place. As another example, an automatic speech recognition (ASR) engine can be used to process audio data that includes a spoken utterance, to generate a transcription (i.e., sequence of term(s) and/or other token(s)) of the user's utterance. The ASR engine can process audio data based on its following occurrence of a spoken hotword, as detected by the hotword detection engine, and/or in response to other invocation(s) of the automated assistant. As another example, a natural language understanding (NLU) engine can be used to process text of a request (e.g., text converted from a spoken utterance using ASR) to generate a symbolic representation, or belief state, that is a semantic representation of the text. For instance, the belief state could include intent(s) that correspond to the text and optionally parameter (s) (e.g., slot values) for the intent(s). The belief state, once fully formed (e.g., all mandatory parameters resolved) through one or more dialog turns, represents action(s) to be performed responsive to the spoken utterance. A separate fulfillment component can then utilize the fully formed belief state to perform the action(s) that corresponds to the belief state.

Automated assistants may also include one or more warm word detecting engines that can be used to process audio data by monitoring for occurrence of a particular spoken warm word (e.g., "stop", "volume up", "volume down", or "next") and, in response to detecting the occurrence of the particular warm word, cause a command to be implemented that is mapped to the particular warm word. An environment (e.g., a particular location, such as a room in a user's home) may include multiple client devices executing automated assistants (i.e., automated assistant devices) that are proximately located. In an environment, each of multiple automated assistant devices may detect (e.g., via microphone(s)) the same spoken utterance from a user, as a result of being proximately located. For a particular warm word, multiple automated assistant devices in the environment may be capable of detecting the particular warm word. Accordingly, in an environment, two or more automated assistant devices may be capable of responding to a spoken utterance that includes the particular warm word.

Due to resource constraints (e.g., memory constraints and processing constraints), a particular automated assistant may only be able to utilize a limited number of warm word detecting engines and/or may only be able to detect a limited number of warm words at any given time. This can be especially true for older and/or lower resource assistant devices, which can lack: (a) the processing power and/or memory capacity to execute various component(s) and/or utilize their associated model(s); (b) and/or the disk-space capacity to store various associated model(s). Additionally, computing resources may be wasted in cases where each of two or more automated assistant devices detects the same spoken utterance, each detects a particular warm word in that spoken utterance, and/or each responds to cause a command to be implemented that is mapped to the particular warm word.

SUMMARY

Some implementations disclosed herein are directed to warm word arbitration between automated assistant devices. As described in more detail herein, two or more automated assistant devices that are proximately located within an environment may perform warm word arbitration to determine the warm words that will be detected by each automated assistant device in the environment. Implementations may reduce overall processing costs by reducing or avoiding the occurrence of two or more automated assistant devices detecting the same warm word. Additionally, by more efficiently utilizing the overall memory and processing resources across multiple automated assistant devices within a particular environment, implementations may allow for detection of a larger set of warm words across the multiple automated assistant devices.

In various implementations, a method implemented by one or more processors may include: determining that warm word arbitration is to be initiated between a first assistant device and one or more additional assistant devices, the one or more additional assistant devices including a second assistant device, and the first assistant device and the one or more additional assistant devices being included in a group of assistant devices; in response to determining that warm word arbitration is to be initiated, performing warm word arbitration, the warm word arbitration including: broadcasting, by the first assistant device, to the one or more additional assistant devices in the group of assistant devices, an active set of warm words for the first assistant device; for each of the one or more additional assistant devices in the group of assistant devices, receiving, from the additional assistant device, an active set of warm words for the additional assistant device; identifying a matching warm word based on the matching warm word being included in the active set of warm words for the first assistant device and being included in the active set of warm words for the second assistant device; and enabling or disabling detection of the matching warm word by the first assistant device, in response to identifying the matching warm word.

In some implementations, the method may further include discovering the additional assistant devices in the group of assistant devices using a wireless protocol. In some implementations, determining that warm word arbitration is to be initiated may be based on discovery of a new assistant device in the group of assistant devices. In some implementations, determining that warm word arbitration is to be initiated may be based on an addition of a warm word or a removal of a warm word in the active set of warm words for the first assistant device. In some implementations, determining that warm word arbitration is to be initiated may be based on a change in ambient context detected by the first assistant device. In some implementations, determining that warm word arbitration is to be initiated may be based on determining that an assistant device has been removed from the group of assistant devices.

In some implementations, the method may further include: broadcasting, by the first assistant device, to the one or more additional assistant devices in the group of assistant devices, for each warm word in the active set of warm words for the first assistant device, an affinity score for the warm word; and for each of the one or more additional assistant devices in the group of assistant devices, receiving, from the additional assistant device, for each warm word in the active set of warm words for the additional assistant device, an affinity score for the warm word. In some implementations, enabling or disabling detection of the matching warm word by the first assistant device, in response to identifying the matching warm word, may be based on the affinity score for the matching warm word for the first assistant device and the affinity score for the matching warm word for the second assistant device.

In some implementations, for each warm word in the active set of warm words for the first assistant device, the affinity score for the warm word may be determined based on a frequency of detection of the warm word by the first assistant device; and for each of the one or more additional assistant devices: for each warm word in the active set of warm words for the additional assistant device, the affinity score for the warm word may be determined based on a frequency of detection of the warm word by the additional assistant device.

In some implementations, for each warm word in the active set of warm words for the first assistant device, the affinity score for the warm word may be determined based on a time when the warm word was most recently detected by the first assistant device; and for each of the one or more additional assistant devices: for each warm word in the active set of warm words for the additional assistant device, the affinity score for the warm word may be determined based on a time when the warm word was most recently detected by the additional assistant device.

In some implementations, for each warm word in the active set of warm words for the first assistant device, the affinity score for the warm word may be determined based on device features of the first assistant device; and for each of the one or more additional assistant devices: for each warm word in the active set of warm words for the additional assistant device, the affinity score for the warm word may be determined based on device features of the additional assistant device.

In some implementations, in enabling or disabling detection of the matching warm word by the first assistant device, the first assistant device may disable detection of the warm word. In some implementations, the method may further include, in response to disabling detection of the warm word by the first assistant device, adding a new warm word to the active set of warm words for the first assistant device. In some implementations, the method may further include repeating the warm word arbitration process until, in an iteration of the warm word arbitration process, a matching warm word is not detected.

In some implementations, the method may further include: detecting, via a microphone of the first assistant device, a spoken utterance; identifying, by the first assistant device, using an on-device warm word detection model for the matching warm word, occurrence of the matching warm word in the spoken utterance; determining, based on performing automatic speech recognition on at least a portion of the spoken utterance that precedes the matching warm word or that follows the matching warm word, that the second assistant device is a target of a command that is mapped to the matching warm word; and in response to determining that the second assistant device is the target of the command that is mapped to the matching warm word, sending the command, that is mapped to the matching warm word, to the second assistant device.

In some implementations, the method may further include determining to include the first assistant device and the one or more additional assistant devices in the group of assistant devices based on determining that the first assistant device and the one or more additional assistant devices are proximately located. In some implementations, the method may further include determining that the group of assistant devices includes the first assistant device and the one or more additional assistant devices based on the first assistant device and the one or more additional assistant devices each detecting a same spoken utterance.

In some additional or alternative implementations, a computer program product may include one or more computer-readable storage media having program instructions collectively stored on the one or more computer-readable storage media. The program instructions may be executable to: identify a first set of on-device warm word detection models that are active on a first assistant device and a second set of on-device warm word detection models that are active on a second assistant device, the first assistant device and the second assistant device being proximately located; identify a duplicate on-device warm word detection model that is included in both the first set of on-device warm word detection models and the second set of on-device warm word detection models; and disable the duplicate on-device warm word detection model on one of the first assistant device and the second assistant device, in response to identifying the duplicate on-device warm word detection model and based on the first assistant device and the second assistant device being determined to be proximately located.

In some implementations, the first assistant device and the second assistant device may be determined to be proximately located based on the first assistant device and the second assistant device each detecting a same spoken utterance.

In some implementations, the program instructions may be further executable to, for each of the first assistant device and the second assistant device, identify an affinity score for a warm word associated with the duplicate on-device warm word detection model. In some implementations, disabling the duplicate on-device warm word detection model on one of the first assistant device and the second assistant device may be based on the affinity scores.

In some implementations, the affinity score for the warm word associated with the duplicate on-device warm word detection model may be determined based on a frequency of detection of the warm word. In some implementations, the affinity score for the warm word associated with the duplicate on-device warm word detection model may be determined based on a time when the warm word was most recently detected.

In some additional or alternative implementations, a system may include a processor, a computer-readable memory, one or more computer-readable storage media, and program instructions collectively stored on the one or more computer-readable storage media. The program instructions may be executable to: determine that warm word arbitration is to be initiated between a first assistant device and one or more additional assistant devices, the one or more additional assistant devices including a second assistant device, and the first assistant device and the one or more additional assistant devices being included in a group of assistant devices; in response to determining that warm word arbitration is to be initiated, perform warm word arbitration, the warm word arbitration including: broadcasting, by the first assistant device, to the one or more additional assistant devices in the group of assistant devices, an active set of warm words for the first assistant device; for each of the one or more additional assistant devices in the group of assistant devices, receiving, from the additional assistant device, an active set of warm words for the additional assistant device; identifying a matching warm word based on the matching warm word being included in the active set of warm words for the first assistant device and being included in the active set of warm words for the second assistant device; and enabling or disabling detection of the matching warm word by the first assistant device, in response to identifying the matching warm word.

Through utilization of one or more techniques described herein, overall processing costs across multiple automated assistant devices in an environment may be reduced, and overall memory and processing resources across the multiple automated assistant devices may be more efficiently utilized. This results in improved performance by allowing for detection of a larger set of warm words across the multiple automated assistant devices.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

DETAILED DESCRIPTION

Users may engage an automated assistant using any one of multiple automated assistant devices. For example, some users may possess a coordinated "ecosystem" of automated assistant devices that can receive user input directed to the automated assistant and/or can be controlled by the automated assistant, such as one or more smartphones, one or more tablet computers, one or more vehicle computing systems, one or more wearable computing devices, one or more smart televisions, one or more interactive standalone speakers, one or more interactive standalone speakers with a display, one or more IoT devices, among other assistant devices.

A user can engage in human-to-computer dialog with an automated assistant using any of these assistant devices (assuming an automated assistant client is installed and the assistant device is capable of receiving input). In some cases, these automated assistant devices may be scattered around the user's primary residence, secondary residence, workplace, and/or other structure. For example, mobile assistant devices such as smartphones, tablets, smartwatches, etc., may be on the user's person and/or wherever the user last placed them. Other automated assistant devices, such as traditional desktop computers, smart televisions, interactive standalone speakers, and IoT devices may be more stationary but nonetheless may be located at various places (e.g., rooms) within the user's home or workplace.

Figure 1:
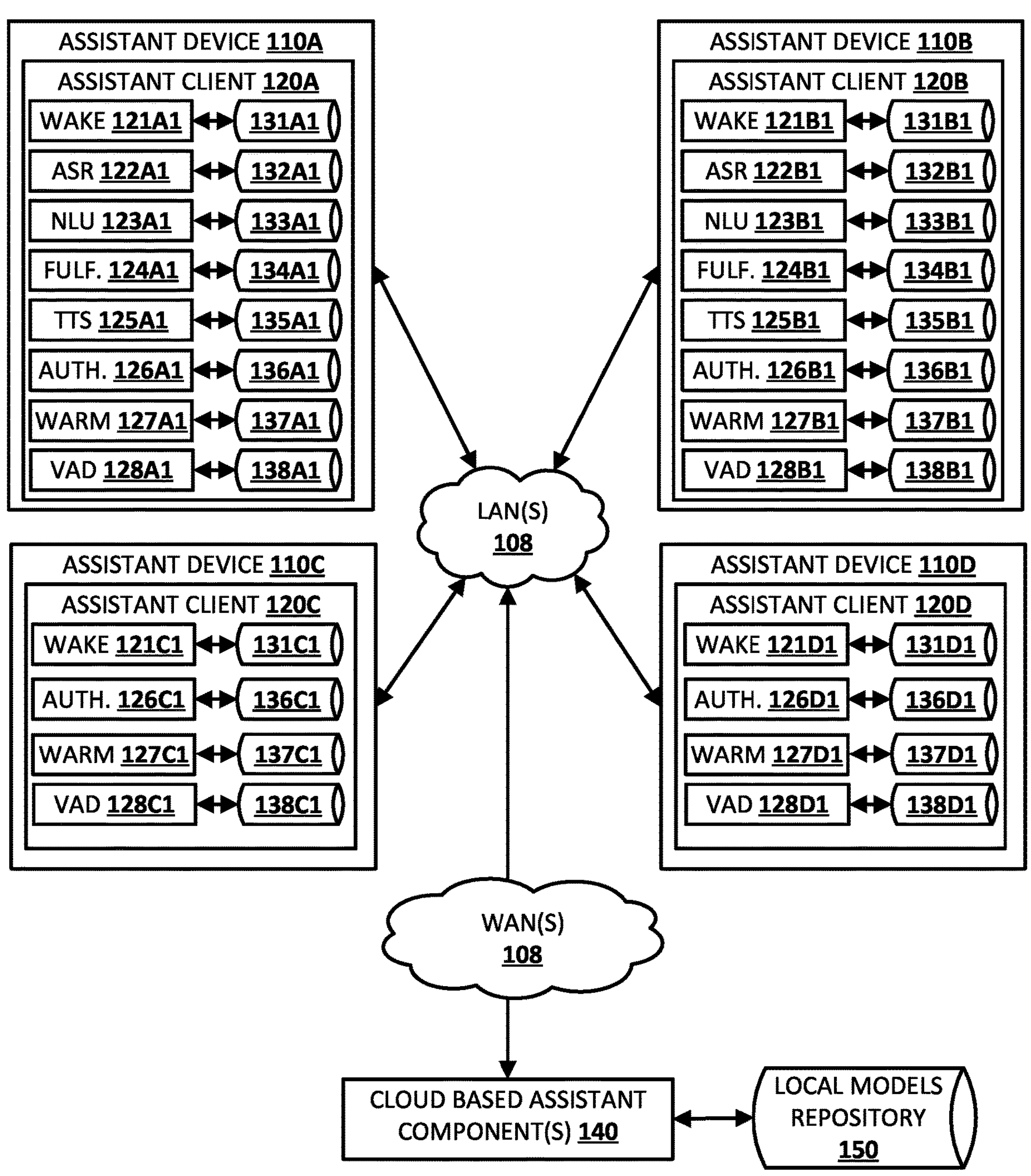
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as cloud-based automated assistant component(s) 140, may be implemented using one or more server computing devices that form what is sometimes referred to as a "cloud infrastructure," although this is not required.

In implementations, the environment 100 may include an automated assistant ecosystem that includes, as an example, first assistant device 110A, second assistant device 110B, third assistant device 110C, and fourth assistant device 110D. The assistant devices 110A-D can all be disposed within a household, a business, or other environment. In implementations, the assistant devices 110A-D may be proximately located within the environment 100. In particular, the physical locations of the assistant devices 110A-D in the environment 100 may be such that each of the assistant devices 110A-D is capable of detecting (e.g., via microphone(s)) the same spoken utterance from a user, e.g., when the user's physical location is in the proximity of the assistant devices 110A-D. For example, each of the assistant devices 110A-D may be physically located in the same room (and/or in the same area of a room) in a household, a business, or other environment, and when a user is also located in that same room and makes an utterance, microphone(s) of each of the assistant devices 110A-D may detect that utterance. In another example, each of the assistant devices 110A-D may be physically located in different rooms in a household, a business, or other environment but still situated close enough to each other that, when a user makes an utterance that is detected by microphone(s) of one of the assistant devices 110A-D, microphone(s) of the other assistant devices 110A-D also detect the same utterance.

Further, the assistant devices 110A-D can all be linked together, or otherwise associated with one another, in one or more data structures. For example, the four assistant devices 110A-D can all be registered with the same user account, registered with the same set of user account(s), registered with a particular structure, and/or all assigned to a particular structure in a device topology representation. The device topology representation can include, for each of the assistant devices 110A-D, corresponding unique identifier(s) and can optionally include corresponding unique identifier(s) for other device(s) that are not assistant devices (but can be interacted with via an assistant device), such as IoT device (s) that do not include an assistant interface. Further, the device topology representation can specify device attribute (s) associated with the respective assistant devices 110A-D. The device attributes for a given assistant device can indicate, for example, one or more input and/or output modalities supported by the respective assistant devices, processing capabilities for the respective assistant devices, a make, model, and/or unique identifier (e.g., serial number) of the respective assistant devices (based on which processing capabilities can be determined), and/or other attribute(s). As another example, the assistant devices 110A-D can all be linked together, or otherwise associated with one another, as a function of being connected to the same wireless network, such as a secure access wireless network and/or as a function of collectively being in peer-to-peer communication with one another (e.g., via Bluetooth and after pairing(s)). Put another way, in some implementations, multiple assistant devices can be considered linked together as a function of being in secure network connection with one another and without necessarily being associated with one another in any data structure.

As a non-limiting working example, the first assistant device 110A can be a first type of assistant device, such as a particular model of an interactive standalone speaker with a display and a camera. The second assistant device 110B can be a second type of assistant device, such as a second model of an interactive standalone speaker without a display or camera. Assistant devices 110C and 110D can each be a third type of assistant device, such as a third model of an interactive standalone speaker without a display. The third type (assistant devices 110C and 110D) can have less processing capabilities than the second type (assistant device 110B). For example, the third type can have processor(s) with less processing capabilities than processor(s) of the second type. For instance, the processor(s) of the third type can lack any GPU whereas the processor(s) of the second type include GPU(s). Also, for instance, the processor(s) of the third type can have a smaller cache and/or a lower operating frequency than the processors(s) of the second type. As another example, the size of the on-device memory of the third type can be less than the size of the on-device memory of the second type (e.g., 1 GB as compared to 2 GB). As yet another example, the available disk space of the third type can be less than the available disk space of the first type. The available disk space can be different from the currently available disk space. For example, the available disk space can be determined as the currently available disk space plus disk space currently occupied by one or more on-device model(s). As another example, the available disk space can be the total disk space, subtracting away any space occupied by an operating system and/or other particular software. Continuing with the working example, the first type and the second type can have the same processing capabilities.

In addition to being linked together in data structure(s), two or more (e.g., all) of the assistant devices 110A-D are also at least selectively in communication with one another via local area network(s) (LAN(s)) 108. LAN(s) 108 can include wireless network(s) such as those utilizing Wi-Fi, direct peer-to-peer network(s) such as those utilizing Bluetooth, and/or other communication topologies utilizing other communication protocol(s).

The assistant device 110A includes an assistant client 120A, which can be a standalone application on top of an operating system or can form all or part of the operating system of the assistant device 110A. The assistant client 120A, in FIG. 1, includes a wake/invocation (hotword) engine 121A1 and one or more associated on-device wake/invocation (hotword) models 131A1. The wake/invocation engine 121A1 can monitor for occurrence of one or more wake or invocation cues (e.g., hotwords) and, responsive to detecting one or more of the cue(s), can invoke one or more previously inactive functions of the assistant client 120A. For example, invoking the assistant client 120A can include causing ASR engine 122A1, NLU engine 123A1, and/or other engine(s) to be activated. For instance, it can cause ASR engine 122A1 to process further audio data frames that follow the wake or invocation cues (whereas prior to invoking no further processing of audio data frames was occurring) and/or can cause the assistant client 120A to transmit the further audio data frames and/or other data to be transmitted to cloud based assistant component(s) 140 for processing (e.g., processing of audio data frames by a remote ASR engine of cloud based assistant component(s) 140).

In some implementations, the wake cue(s) engine 121A can continuously process (e.g., if not in an "inactive" mode) a stream of audio data frames that are based on output from one or more microphones of the assistant device 110A, to monitor for an occurrence of a spoken wake word(s) or invocation phrase(s) (e.g., "OK Assistant", "Hey Assistant"). The processing can be performed by the wake cue(s) engine 121A utilizing one or more of the wake model(s) 131A1. For example, one of the wake model(s) 131A1 can be a neural network model trained to process frames of audio data and generate output that indicates whether one or more wake words are present in the audio data. While monitoring for the occurrence of the wake word(s), the wake cue(s) engine 121 discards (e.g., after temporary storage in a buffer) any audio data frames that do not include the wake word(s). The wake cue(s) engine 121A1 can, in addition to or instead of monitoring for occurrence of wake word(s), monitor for occurrence of other invocation cue(s). For example, the wake cue(s) engine 121A1 can also monitor for a press of an invocation hardware button and/or of an invocation software button. As another example, and continuing with the working example, when the assistant device 110A include a camera, the wake cue(s) engine 121A1 can also optionally process image frame(s) from the camera in monitoring for occurrence of an invocation gesture(s) such as a hand wave while a user's gaze is directed at the camera and/or other invocation cue(s) such as a user's gaze being directed at the camera along with an indication that the user is speaking.

The assistant client 120A, in FIG. 1, also includes an automatic speech recognition (ASR) engine 122A1 and one or more associated on-device ASR models 132A1. The ASR engine 122A1 can be used to process audio data that includes a spoken utterance, to generate a transcription (i.e., sequence of term(s) and/or other token(s)) of the user's utterance. The ASR engine 122A1 can process audio data utilizing the on-device ASR model(s) 132A1. The on-device ASR model(s) 132A1 can include, for example, a two-pass ASR model that is a neural network model and that is utilized by the ASR engine 122A1 to generate a sequence of probabilities over tokens (and the probabilities utilized to generate the transcript). As another example, the on-device ASR model(s) 132A1 can include an acoustic model that is a neural network model, and a language model that includes a mapping of phoneme sequences to words. The ASR engine 122A1 can process audio data using the acoustic model, to generate a sequence of phonemes, and map the sequence of phonemes to particular terms using the language model. Additional or alternative ASR models can be utilized.

The assistant client 120A, in FIG. 1, also includes a natural language understanding (NLU) engine 123A1 and one or more associated on-device NLU models 133A1. The NLU engine 123A1 can generate a symbolic representation, or belief state, that is a semantic representation of natural language text, such as text in a transcription generated by ASR engine 122A1 or typed text (e.g., typed utilizing a virtual keyboard of assistant device 110A). For instance, the belief state could include intent(s) that correspond to the text and optionally parameter(s) (e.g., slot values) for the intent (s). The belief state, once fully formed (e.g., all mandatory parameters resolved) through one or more dialog turns, represents action(s) to be performed responsive to the spoken utterance. In generating the symbolic representation, the NLU engine 123A1 can utilize one or more on-device NLU models 133A1. The NLU model(s) 133A1 can include one or more neural network models that are trained to process text and generate output that indicates intent(s) expressed by the text and/or an indication of which portion(s) of text correspond to which parameter(s) for the intent. The NLU model(s) can additionally or alternatively include one or more models that include mappings of text and/or templates, to corresponding symbolic representation(s). For example, the mappings can include a mapping of the text "what time is it" to an intent of "current time" with parameters of "current location". As another example, the mappings can include a mapping of the template "add [item(s)] to my shopping list" to an intent of "insert in shopping list" with parameter(s) of the item(s) that are included in the actual natural language that corresponds to the [item(s)] in the template.

The assistant client 120A, in FIG. 1, also includes a fulfillment engine 124A1 and one or more associated on-device fulfillment models 134A1. The fulfillment engine 124A1 can utilize a fully formed symbolic representation, from the NLU engine 123A1, to perform, or cause performance of, the action(s) that corresponds to the symbolic representation. The action(s) can include providing responsive user interface output (e.g., audible and/or visual user interface output), controlling smart device(s), and/or performing other action(s). In performing or causing performance of the action(s), the fulfillment engine 124A1 can utilize fulfillment model(s) 134A1. As one example, for an intent of "turn on" with parameter(s) that specify particular smart light(s), the fulfillment engine 124A1 can utilize the fulfillment model(s) 134A1 to identify network address(es) of the particular smart light(s) and/or command(s) to transmit to cause the particular smart light(s) to transition to an "on" state. As another example, for an intent of "current" with a parameter of "current location", the fulfillment engine 124A1 can utilize the fulfillment model(s) 134A1 to identify that a current time at the assistant device 110A should be retrieved and audibly rendered (utilizing the TTS engine 125A1).

The assistant client 120A, in FIG. 1, also includes a text-to-speech (TTS) engine 125A1 and one or more associated on-device TTS models 135A1. The TTS engine 125A1 can process text (or a phonetic representation thereof) utilizing the on-device TTS model(s) 135A1 to generate synthesized speech. The synthesized speech can be audibly rendered via speaker(s) of the assistant device 110A local text-to-speech ("TTS") engine (that converts text to speech). Synthesized speech can be generated and rendered as all or part of a response from the automated assistant and/or in prompting the user to define and/or clarify parameter(s) and/or intent(s) (e.g., as orchestrated by NLU engine 123A1 and/or a separate dialog state engine).

The assistant client 120A, in FIG. 1, also includes an authentication engine 126A1 and one or more associated on-device authentication models 136A1. The authentication engine 126A1 can utilize one or more authentication technique(s) to verify which of multiple registered user is interacting with the assistant device 110 or, if only a single user is registered for the assistant device 110, whether it is the registered user interacting with the assistant device 110 (or instead a guest/unregistered user). As one example, text-dependent speaker verification(s) (TD-SV(s)) can be generated and stored for each of the registered users (e.g., in association with their corresponding user profiles), with permission from the associated user(s). The authentication engine 126A1 can utilize a TD-SV model, of the on-device authentication model(s) 136A1 in generating a corresponding TD-SV and/or in processing a corresponding portion of audio data TD-SV to generate a corresponding current TD-SV that can then be compared to the stored TD-SV(s) to determine whether there is a match. As other examples, the authentication engine 126A1 can additionally or alternatively utilize text-independent speaker verification (TI-SV) techniques, speaker verification techniques, facial verification techniques, and/or other verification technique(s) (e.g., PIN entry)—and corresponding on-device authentication model(s) 136A1 in authenticating a particular user.

The assistant client 120A, in FIG. 1, also includes a warm word(s) engine 127A1 and one or more associated on-device warm word(s) models 137A1. The warm word(s) engine 127A1 can at least selectively monitor for occurrence of one or more warm word(s) or other warm cue(s) and, responsive to detecting one or more of the warm word(s) or other warm cue(s), cause a particular action to be performed by the assistant client 120A. The warm word(s) can be in addition to any wake word(s) or other wake cue(s) and each of the warm word(s) can be at least selectively active (e.g., enabled). Notably, detecting the occurrence of a warm cue causes a particular action to be performed even when the detected occurrence is not preceded by any wake cue. Accordingly, when a warm cue is a particular word or words, a user can simply speak the word(s), without needing to provide any wake cue(s), and cause performance of a corresponding particular action.

As one example, a "stop" warm word can be active (e.g., enabled) at least at times when a timer or alarm is being audibly rendered at assistant device 110A via assistant client 120A. For instance, at such times the warm word(s) engine 127A can continuously (or at least when VAD engine 128A1 detects voice activity) process a stream of audio data frames that are based on output from one or more microphones of the assistant device 110A, to monitor for an occurrence of "stop", "halt", or other limited set of particular warm word(s). The processing can be performed by the warm word(s) engine 127A utilizing one of the warm word(s) model(s) 137A1, such as a neural network model trained to process frames of audio data and generate output that indicates whether a spoken occurrence of "stop" is present in the audio data. In response to detecting occurrence of "stop", the warm word(s) engine 127A can cause a command to be implemented that clears the audibly sounding timer or alarm. At such times the warm word(s) engine 127A can continuously (or at least when a presence sensor detects presence) process a stream of images, form a camera of the assistant device 110A, to monitor for occurrence of a hand in a "stop" pose. The processing can be performed by the warm word(s) engine 127A utilizing, one of the warm words(s) model(s) 137A1, such as a neural network model trained to process frames of vision data and generate output that indicates whether hand is present an in a "stop" pose. In response to detecting occurrence of the "stop" pose, the warm cue(s) engine 127A can cause a command to be implemented that clears the audibly sounding timer or alarm.

As another example, "volume up", "volume down", and "next" warm word(s) can be active (e.g., enabled) at least at times when music or other media content is being audibly rendered at assistant device 110A via assistant client 120A. For instance, at such times the warm word(s) engine 127A can continuously process a stream of audio data frames that are based on output from one or more microphones of the assistant device 110A. The processing can includes using a first of the warm word(s) model(s) 137A1 to monitor for an occurrence of "volume up", using a second of the warm word(s) model(s) 137A1 to monitor for occurrence of "volume down", and using a third of the warm word(s) model(s) 137A1 to monitor for occurrence of "next". In some implementations, the different warm word(s) model(s) 137A1 can be loaded into memory from a storage device of assistant device 110A or can be downloaded, by the assistant device 110A, from a local models repository 150 that is accessible via interaction with the cloud based assistant component(s) 140. In response to detecting occurrence of "volume up", the warm word(s) engine 127A can cause a command to be implemented that increases the volume of the music being rendered, in response to detecting occurrence of "volume down", the warm word(s) engine can cause a command to be implemented that decreases the volume of the music, and in response to detecting occurrence of "next", the warm word (s) engine can cause a command to be implemented that causes a next track to be rendered instead of the current music track.

Continuing the example, at times when music is not being audibly rendered at assistant device 110A via assistant client 120A, "volume up", "volume down", and "next" warm word(s) can be inactive (e.g., disabled), and the warm word(s) engine 127A may not monitor for occurrences of the aforementioned warm words. In particular, the first of the warm word(s) model(s) 137A1 that is used to monitor for an occurrence of "volume up", the second of the warm word(s) model(s) 137A1 that is used to monitor for occurrence of "volume down", and the third of the warm word(s) model(s) 137A1 that is used to monitor for occurrence of "next" may not be loaded into memory by assistant client 120A.

In some implementations, a set of warm words detected by assistant device 110A using warm word(s) model(s) 137A may be user configured and/or automatically selected based on a current context and/or capabilities of assistant device 110A.

In another example, assistant client 120A may enable detection of a new warm word by the warm word(s) engine 127A by causing new warm word(s) model(s) 137A1 to be loaded into memory, e.g., from a storage device of assistant device 110A or from a download from a local models repository 150 that is accessible via interaction with the cloud based assistant component(s) 140. Assistant client 120A may disable detection of a warm word by the warm word(s) engine 127A by avoiding loading warm word(s) model(s) 137A1 corresponding to the warm word into memory, and/or by unloading warm word(s) model(s) 137A1 corresponding to the warm word from memory. While unloaded from memory, warm word(s) model(s) 137A1 may remain stored in a storage device of assistant device 110A and may be loaded or reloaded into memory at another point in time, e.g., to enable detection of the corresponding warm word. Alternatively, assistant client 120A may disable detection of a warm word by the warm word(s) engine 127A by purging warm word(s) model(s) 137A1 from assistant device 110A, e.g., by unloading warm word(s) model(s) 137A1 from memory and also deleting warm word(s) model(s) 137A1 from a storage device of assistant device 110A.

The assistant client 120A also includes a voice activity detector (VAD) engine 128A1 and one or more associated on-device VAD models 138A1. The VAD engine 128A1 can at least selectively monitor for occurrence of voice activity in audio data and, responsive to detecting an occurrence, cause one or more functions to be performed by the assistant client 120A. For example, the VAD engine 128A1, responsive to detecting voice activity, can cause the wake cue(s) engine 121A1 to be activated. As another example, the VAD engine 128A1 can be utilized in a continued listening mode to monitor for occurrence of voice activity in audio data and, responsive to detecting an occurrence, cause the ASR engine 122A1 to be activated. The VAD engine 128A1 can process audio data utilizing VAD model(s) 138A1 in determining whether voice activity is present in the audio data.

Particular engines and corresponding models have been described with respect to assistant client 120A. However, it is noted that some engines can be omitted and/or additional engine(s) can be included. It is also noted that assistant client 120A, through its various on-device engines and corresponding models, can fully process many assistant requests, including many assistant requests that are provided as spoken utterances. However, because the assistant device 110A is relatively constrained in terms of processing capabilities, there are still many assistant requests that cannot be fully processed locally at the assistant device 110A. For example, the NLU engine 123A1 and/or corresponding NLU models 133A1 may only cover a subset of all available intents and/or parameters available via the automated assistant. As another example, the fulfillment engine 124A1 and/or corresponding fulfillment model(s) may only cover a subset of available fulfillments. As yet another example, the ASR engine 122A1 and corresponding ASR model(s) 132A1 may not be robust and/or accurate enough to correctly transcribe various spoken utterances.

In view of these and other considerations, cloud based assistant component(s) 140 can still be at least selectively utilized in performing at least some processing of assistant requests received at the assistant device 110A. Cloud based automated assistant components 140 can include counterpart engines and/or models to those of the assistant device 110A (and/or additional or alternatives). However, since cloud based automated assistant components 140 can leverage the virtually limitless resources of the cloud, one or more the cloud based counterparts can be more robust and/or accurate than those of the assistant client 120A. As one example, in response to a spoken utterance that seeks performance of assistant action(s) not supported by the local NLU engine 123A1 and/or the local fulfillment engine 124A1, the assistant client 120A can transmit audio data for the spoken utterance, and/or a transcription thereof generated by ASR engine 122A1, to the cloud based automated assistant components 140. The cloud based automated assistant components 140 (e.g., an NLU engine and/or fulfillment engine thereof) can perform more robust processing of such data, enabling resolution and/or performance of the assistant action(s). The transmitting of data to the cloud based automated assistant components 140 is via one or more wide area networks (WAN(s)) 109, such as the Internet or a private WAN.

The second assistant device 110B includes an assistant client 120B, which can be a standalone application on top of an operating system or can form all or part of the operating system of the assistant device 110B. Like assistant client 120A, the assistant client 120B includes: a wake/invocation engine 121B1 and one or more associated on-device wake/invocation models 131B1; an ASR engine 122B1 and one or more associated on-device ASR models 132B1; an NLU engine 123B1 and one or more associated on-device NLU models 133B1; a fulfillment engine 124B1 and one or more associated on-device fulfillment models 134B1; a TTS engine 125B1 and one or more associated on-device TTS models 135B1; an authentication engine 126B1 and one or more associated on-device authentication models 136B1; a warm word(s) engine 127B1 and one or more associated on-device warm word(s) models 137B1; and a VAD engine 128B1 and one or more associated on-device VAD models 138B1.

Some or all of the engines and/or the models of assistant client 120B can be the same as those of assistant client 120A and/or some or all of the engines and/or the models can differ. For example, the wake cue(s) engine 121B1 may lack the functionality to detect wake cue(s) in image(s) and/or the wake model(s) 131B1 may lack model(s) for processing image(s) for detection of wake cue(s)—while wake cue(s) engine 121A1 includes such functionality and wake model (s) 131B1 include such model(s). This can be due to, for example, assistant device 110A including a camera and assistant device 110B not including a camera. As another example, the ASR model(s) 131B1 utilized by ASR engine 122B1 can differ from the ASR model(s) 131A1 utilized by ASR engine 122A1. This can be due to, for example, different models being optimized for differing processor and/or memory capabilities amongst the assistant device 110A and the assistant device 110B.

Particular engines and corresponding models have been described with respect to assistant client 120B. However, it is noted that some engines can be omitted and/or additional engine(s) can be included. It is also noted that assistant client 120B, through its various on-device engines and corresponding models, can fully process many assistant requests, including many assistant requests that are provided as spoken utterances. However, because the client device 110B is relatively constrained in terms of processing capabilities, there are still many assistant requests that cannot be fully processed locally at the assistant device 110B. In view of these and other considerations, cloud based assistant component(s) 140 can still be at least selectively utilized in performing at least some processing of assistant requests received at the assistant device 110B.

The third assistant device 110C includes an assistant client 120C, which can be a standalone application on top of an operating system or can form all or part of the operating system of the assistant device 110C. Like assistant client 120A and assistant client 120B, the assistant client 120C includes: a wake/invocation engine 121C1 and one or more associated on-device wake/invocation models 131C1; an authentication engine 126C1 and one or more associated on-device authentication models 136C1; a warm word(s) engine 127C1 and one or more associated on-device warm word(s) models 137C1; and a VAD engine 128C1 and one or more associated on-device VAD models 138C1. Some or all of the engines and/or the models of assistant client 120C can be the same as those of assistant client 120A and/or assistant client 120B and/or some or all of the engines and/or the models can differ.

However, it is noted that unlike assistant client 120A and assistant client 120B, the assistant client 120C does not include: any ASR engine or associated models; any NLU engine or associated models; any fulfillment engine or associated models; and any TTS engine or associated models. Further, it is also noted that assistant client 120B, through its various on-device engines and corresponding models, can fully process only certain assistant request(s) (i.e., those that conform to warm word(s) detected by warm word(s) engine 127C1) and cannot process many assistant requests, such as those that are provided as spoken utterances and that do not conform to a warm cue. In view of these and other considerations, cloud based assistant component(s) 140 can still be at least selectively utilized in performing at least some processing of assistant requests received at the assistant device 110C.

The fourth assistant device 110D includes an assistant client 120D, which can be a standalone application on top of an operating system or can form all or part of the operating system of the assistant device 110D. Like assistant client 120A, assistant client 120B, and assistant client 120C, the assistant client 120D includes: a wake/invocation engine 121D1 and one or more associated on-device wake/invocation models 131D1; an authentication engine 126D1 and one or more associated on-device authentication models 136D1; a warm word(s) engine 127D1 and one or more associated on-device warm word(s) models 137D1; and a VAD engine 128D1 and one or more associated on-device VAD models 138D1. Some or all of the engines and/or the models of assistant client 120C can be the same as those of assistant client 120A, assistant client 120B, and/or assistant client 120C—and/or some or all of the engines and/or the models can differ.

However, it is noted that unlike assistant client 120A and assistant client 120B—and like assistant client 120C, the assistant client 120D does not include: any ASR engine or associated models; any NLU engine or associated models; any fulfillment engine or associated models; and any TTS engine or associated models. Further, it is also noted that assistant client 120D, through its various on-device engines and corresponding models, can fully process only certain assistant request(s) (i.e., those that conform to warm cue(s) detected by warm word(s) engine 127D1) and cannot process many assistant requests, such as those that are provided as spoken utterances and that do not conform to a warm word. In view of these and other considerations, cloud based assistant component(s) 140 can still be at least selectively utilized in performing at least some processing of assistant requests received at the assistant device 110D.

Figure 2:
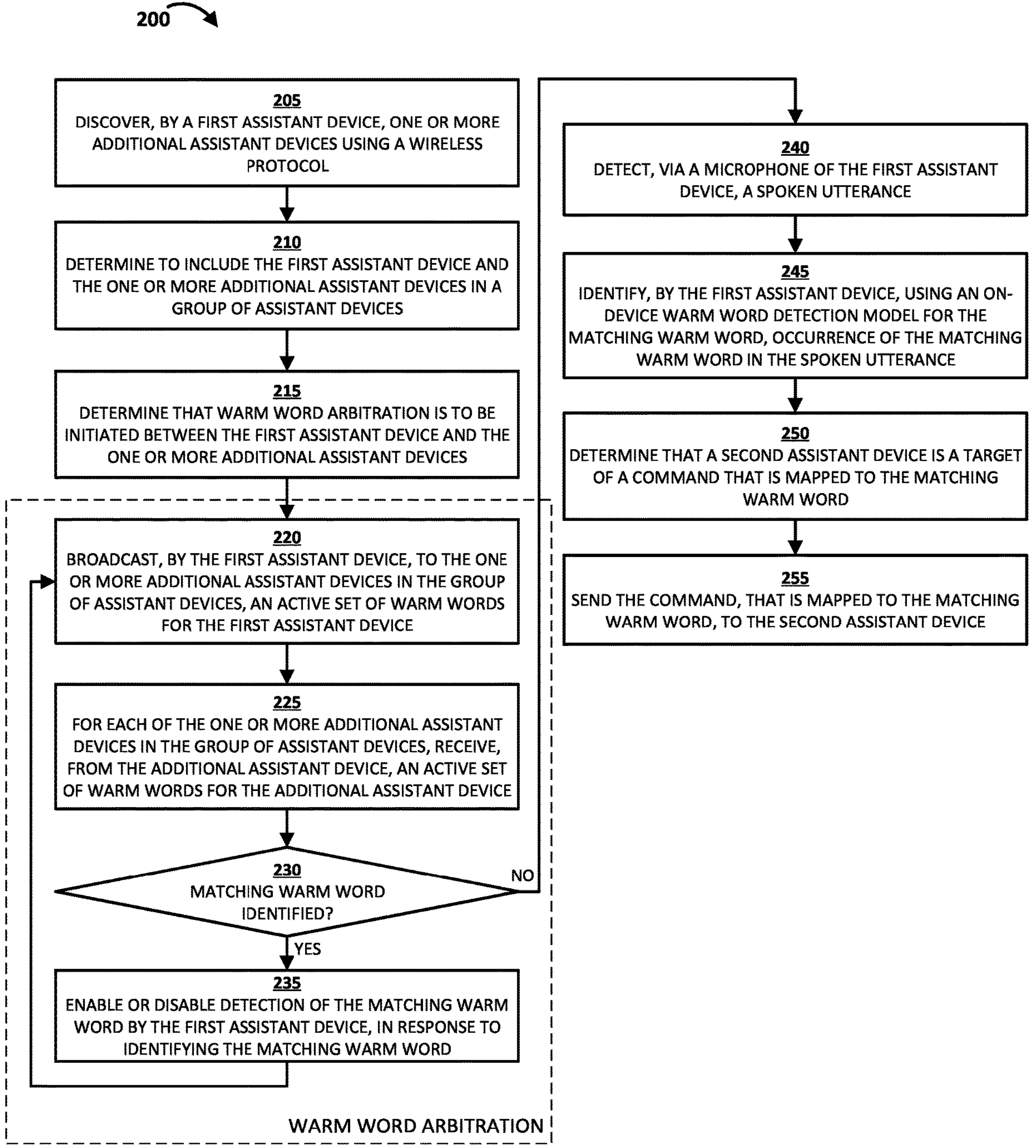
FIG. 2 depicts a flowchart illustrating an example method for practicing selected aspects of the present disclosure.

FIG. 2 is a flowchart illustrating an example method 200 for warm word arbitration between automated assistant devices, in accordance with implementations disclosed herein. For convenience, the operations of the flowchart are described with reference to a system that performs the operations. This system may include various components of various computer systems, such as one or more components of the assistant devices 110A-D. Moreover, while operations of method 200 are shown in a particular order, this is not meant to be limiting. One or more operations may be reordered, omitted, or added.

At block 205, the system discovers, by a first assistant device, one or more additional assistant devices in a group of assistant devices using a wireless protocol. In implementations, at block 205, the assistant client 120A executing on a first assistant device (e.g., assistant device 110A) discovers one or more additional assistant devices (e.g., assistant devices 110B-D) in a group of assistant devices (e.g., the group of assistant devices 110A-D which are proximately located in environment 100) using a wireless protocol (e.g., Bluetooth, Wi-Fi, ultrasound audio, etc.). In some implementations, the one or more additional assistant devices include a second assistant device (e.g., assistant device 110B).

At block 210, the system determines to include the first assistant device and the one or more additional assistant devices in the group of assistant devices. In implementations, at block 210, the assistant client 120A executing on assistant device 110A determines to include the first assistant device (e.g., assistant device 110A) and the one or more additional assistant devices (e.g., the assistant devices 110B-D), discovered at block 205, in the group of assistant devices. In some implementations, determining to include the first assistant device and the one or more additional assistant devices in the group of assistant devices is based on determining that the first assistant device and the one or more additional assistant devices are proximately located. In other implementations, determining that the group of assistant devices includes the first assistant device and the one or more additional assistant devices is based on the first assistant device and the one or more additional assistant devices each detecting a same spoken utterance. In some implementations, determining to include the first assistant device and the one or more additional assistant devices in the group of assistant devices may be further based on the first assistant device and the one or more additional assistant devices all being registered with the same user account, registered with the same set of user account(s), etc.

Still referring to block 210, in some implementations, assistant devices may be determined to be proximately located based on occurrence(s) of detecting the same spoken utterance(s) with at least a threshold "loudness" and/or with a threshold signal-to-noise (SNR) ratio, and the loudness and/or SNR ratio between the assistant devices being similar for occurrence(s). In other words, two or more assistant devices may be determined to be proximately located based on all of the assistant devices detecting the same spoken utterance(s) clearly. In other implementations, two or more assistant devices may be determined to be proximately located based on being assigned to the same room in a home graph. In yet other implementations, a first assistant device may emit a sound via its speakers (optionally at an frequency that is inaudible to humans) and request that other assistant devices use their microphone(s) to listen for the sound and report back regarding whether the sound was detected and/or detected characteristics of the sound (e.g., loudness, SNR, timestamp of detection, etc.). This information regarding whether the sound was detected and/or detected characteristics of the sound may be used by the assistant device to determine which assistant devices are proximately located. In yet other implementations, near field communication (NFC) may be used to determine which assistant devices are proximately located.

At block 215, the system determines that warm word arbitration is to be initiated between the first assistant device and the one or more additional assistant devices. In implementations, at block 215, the assistant client 120A executing on assistant device 110A determines that warm word arbitration is to be initiated between the first assistant device (e.g., assistant device 110A) and the one or more additional assistant devices (e.g., assistant devices 110B-D). In response to determining that warm word arbitration is to be initiated at block 215, the system performs warm word arbitration according to blocks 220 to 235.

Still referring to block 215, in some implementations, determining that warm word arbitration is to be initiated is based on discovery of a new assistant device in the group of assistant devices (e.g., a new assistant device is added to the environment 100 in proximity to assistant devices 110A-D) and/or based on determining that an assistant device has been removed from the group of assistant devices (e.g., an assistant device is no longer detected in the environment 100 in proximity to assistant devices 110A-D). In other implementations, determining that warm word arbitration is to be initiated is based on an addition of a warm word or a removal of a warm word in the active set of warm words for the first assistant device (e.g., assistant device 110A), e.g., based on a user-requested configuration change. In still other implementations, determining that warm word arbitration is to be initiated is based on a change in ambient context detected by the first assistant device (e.g., assistant device 110A), e.g., a new user entering the space in which the first assistant device is located, and/or a user initiating a new activity such as cooking. In some implementations, any of assistant devices 110A-D in the environment 100 may initiate arbitration.

At block 220, the system broadcasts, by the first assistant device, to the one or more additional assistant devices in the group of assistant devices, an active set of warm words for the first assistant device. In implementations, at block 220, the assistant client 120A executing on assistant device 110A broadcasts an active set of warm words for assistant device 110A, to the one or more additional assistant devices (e.g., assistant devices 110B-D) in the group of assistant devices.

Still referring to block 220, in some implementations, the system broadcasts, by the first assistant device (e.g., assistant device 110A), to the one or more additional assistant devices (e.g., assistant devices 110B-D) in the group of assistant devices, for each warm word in the active set of warm words for the first assistant device, an affinity score for the warm word. The affinity scores may be comparable across assistant devices 110A-D and may be determined based on a shared measure. In some implementations, for each warm word in the active set of warm words for the first assistant device, the affinity score for the warm word is determined based on a frequency of detection of the warm word by the first assistant device. In other implementations, for each warm word in the active set of warm words for the first assistant device, the affinity score for the warm word is determined based on a time when the warm word was most recently detected by the first assistant device. The affinity score may also be determined taking into account current context and/or explicit user signals from past interactions. In other implementations, the affinity score for the warm word is determined taking into account the accuracy of the specific warm word model used by the assistant device (e.g., assistant device 110A). For example, a higher resource device may have a more accurate version of the warm word model loaded on device and therefore the affinity score for the warm word for the higher resource device may be higher as compared to the affinity score for the warm word for a lower resource device.

Still referring to block 220, in still other implementations, for each warm word in the active set of warm words for the first assistant device, the affinity score for the warm word may be determined based on device features of the first assistant device. The affinity score may also be determined based on user features and/or warm word embeddings. The affinity score may be determined taking into account warm words that may be related semantically (e.g., "play" and "pause") and/or phonetically similar and that might be more relevant for a particular assistant device, e.g., based on a user's preferred media device. In some implementations, the affinity score may be determined based on output of a machine learning model.

At block 225, for each of the one or more additional assistant devices in the group of assistant devices, the system receives, from the additional assistant device, an active set of warm words for the additional assistant device. In implementations, at block 225, for each of the one or more additional assistant devices in the group of assistant devices (e.g., assistant devices 110B-D), the assistant client 120A executing on assistant device 110A receives, from the additional assistant device, an active set of warm words for the additional assistant device.

Still referring to block 225, in some implementations, for each of the one or more additional assistant devices in the group of assistant devices, the system receives, from the additional assistant device, for each warm word in the active set of warm words for the additional assistant device, an affinity score for the warm word. In some implementations, for each of the one or more additional assistant devices, for each warm word in the active set of warm words for the additional assistant device, the affinity score for the warm word is determined based on a frequency of detection of the warm word by the additional assistant device. In other implementations, for each of the one or more additional assistant devices, for each warm word in the active set of warm words for the additional assistant device, the affinity score for the warm word is determined based on a time when the warm word was most recently detected by the additional assistant device. In still other implementations, for each of the one or more additional assistant devices, for each warm word in the active set of warm words for the additional assistant device, the affinity score for the warm word is determined based on device features of the additional assistant device.

At block 230, the system determines whether or not a matching warm word is identified based on the matching warm word being included in the active set of warm words for the first assistant device and being included in the active set of warm words for the second assistant device. In implementations, at block 230, the assistant client 120A executing on assistant device 110A determines whether or not a matching warm word is identified based on the matching warm word being included in the active set of warm words for the first assistant device (e.g., assistant device 110A) and being included in the active set of warm words for the second assistant device (e.g., assistant device 110B) that is received at block 225.

Still referring to block 230, in response to the assistant client 120A determining that a matching warm word is identified based on the matching warm word being included in the active set of warm words for the first assistant device (e.g., assistant device 110A) and being included in the active set of warm words for the second assistant device (e.g., assistant device 110B), flow proceeds to block 235. On the other hand, in response to the assistant client 120A determining that a matching warm word is not identified, flow proceeds to block 240.

At block 235, the system enables or disables detection of the matching warm word by the first assistant device, in response to identifying the matching warm word. In implementations, at block 235, the assistant client 120A executing on assistant device 110A enables or disables detection of the matching warm word by the first assistant device (e.g., assistant device 110A), in response to identifying the matching warm word at block 230. Subsequently, the flow returns to block 220, and the warm word arbitration process is repeated until, in an iteration of the warm word arbitration process, a matching warm word is not detected at block 230.

Still referring to block 235, in some implementations, assistant client 120A may enable detection of a new warm word by the warm word(s) engine 127A by causing new warm word(s) model(s) 137A1 to be loaded into memory, e.g., from a storage device of assistant device 110A or from a download from a local models repository 150 that is accessible via interaction with the cloud based assistant component(s) 140. In some implementations, assistant client 120A may disable detection of a warm word by the warm word(s) engine 127A by avoiding loading warm word(s) model(s) 137A1 corresponding to the warm word into memory, and/or by unloading warm word(s) model(s) 137A1 corresponding to the warm word from memory. While unloaded from memory, warm word(s) model(s) 137A1 may remain stored in a storage device of assistant device 110A and may be loaded or reloaded into memory at another point in time, e.g., to enable detection of the corresponding warm word. Alternatively, assistant client 120A may disable detection of a warm word by the warm word(s) engine 127A by purging warm word(s) model(s) 137A1 from assistant device 110A, e.g., by unloading warm word(s) model(s) 137A1 from memory and also deleting warm word(s) model(s) 137A1 from a storage device of assistant device 110A.

Still referring to block 235, in some implementations, enabling or disabling detection of the matching warm word by the first assistant device (e.g., assistant device 110A), in response to identifying the matching warm word, is based on the affinity score for the matching warm word for the first assistant device (e.g., assistant device 110A) and the affinity score for the matching warm word for the second assistant device (e.g., assistant device 110B). In particular, in some implementations, if the affinity score for the matching warm word for the first assistant device (e.g., assistant device 110A) is higher than the affinity scores for the matching warm word for the one or more additional assistant devices including the second assistant device (e.g., assistant device 110B), the assistant client 120A executing on assistant device 110A may enable detection of the matching warm word. On the other hand, if it is not the case that the affinity score for the matching warm word for the first assistant device (e.g., assistant device 110A) is higher than the affinity scores for the matching warm word for the one or more additional assistant devices including the second assistant device (e.g., assistant device 110B), the assistant client 120A executing on assistant device 110A may disable detection of the matching warm word.

Still referring to block 235, in some implementations, in response to disabling detection of the warm word by the first assistant device (e.g., assistant device 110A), the first assistant device adds a new warm word to the active set of warm words for the first assistant device. In some implementations, the new warm word may be selected (e.g., by assistant client 120A) based on the new warm word having a next highest affinity score for the first assistant device (e.g., assistant device 110A). In other implementations, the new warm word may be selected (e.g., by assistant client 120A) based on a relation between the new warm word and an existing warm word or set of warm words for which detection is enabled on the first assistant device. For example, if an existing set of warm words includes "volume up", "volume down", and "next track", a new warm word, "previous track", may be added based on "previous track" and the existing set of warm words relating to playback controls for music.

Still referring to block 235, in some implementations, the system may provide an indication to the user (e.g., on a user interface displayed on a display of assistant device 110A) regarding which warm words are active and on which device. For example, assistant device 110A may display a list of available warm words with device icons to illustrate which of assistant devices 110A-D device would handle each warm word.

At block 240, the system detects, via a microphone of the first assistant device, a spoken utterance. In implementations, at block 240, the assistant client 120A executing on assistant device 110A detects, via a microphone of assistant device 110A, a spoken utterance. For example, assistant client 120A may detect the spoken utterance, "set a timer for 3 minutes on my phone". In this example, the user's phone may be assistant device 110B.

At block 245, the system identifies, by the first assistant device, using an on-device warm word detection model for the matching warm word, an occurrence of the matching warm word in the spoken utterance. In implementations, at block 245, the assistant client 120A identifies, using on-device warm word(s) models 137A for the matching warm word, occurrence of the matching warm word in the spoken utterance detected at block 240. For example, assistant client 120A may identify "set a timer" as an occurrence of the matching warm word.

At block 250, the system determines, based on performing automatic speech recognition on at least a portion of the spoken utterance that precedes the matching warm word or that follows the matching warm word, that the second assistant device is a target of a command that is mapped to the matching warm word. In implementations, at block 250, the assistant client 120A determines, based on performing automatic speech recognition (e.g., using ASR engine 122A1) on at least a portion of the spoken utterance (detected at block 240) that precedes the matching warm word or that follows the matching warm word, that a device name provided in the spoken utterance does not match that of the handling device (assistant device 110A) and that, instead, the second assistant device (e.g., assistant device 110B) is a target of a command that is mapped to the matching warm word. In the above example, assistant client 120A determines that "my phone" (i.e., assistant device 110B) is a target of a command that is mapped to the matching warm word ("set a timer").

Still referring to block 250, in some implementations, in addition to modifying handling of the current spoken utterance, a user's explicit assignment of another device as a target of a command that is mapped to the matching warm word may be used to modify ongoing handling of the command that is mapped to the matching warm word. For example, the device specified in the spoken utterance may be assigned to execute the command that is mapped to the matching warm word going forward, at least for a period of time. In this case, assistant client 120A may disable detection of the matching warm word, and assistant client 120B may enable detection of the matching warm word. Assistant client 120A may enable another warm word in place of the matching warm word which was disabled. In some implementations, this change may take effect for a particular amount of time (e.g., n hours, or the rest of the day), or for the duration of a current user activity.

At block 255, in response to determining that the second assistant device is the target of the command that is mapped to the matching warm word, the system sends the command, that is mapped to the matching warm word, to the second assistant device. In implementations, at block 255, in response to determining at block 250 that the second assistant device is the target of the command that is mapped to the matching warm word, the assistant client 120A sends the command, that is mapped to the matching warm word, to the second assistant device (e.g., assistant device 110B). In the example, assistant client 120A sends the command, that is mapped to the matching warm word ("set a timer"), to the user's phone (assistant device 110B).

Figure 3:
FIG. 3 depicts another flowchart illustrating an example method for practicing selected aspects of the present disclosure
Figure 3:
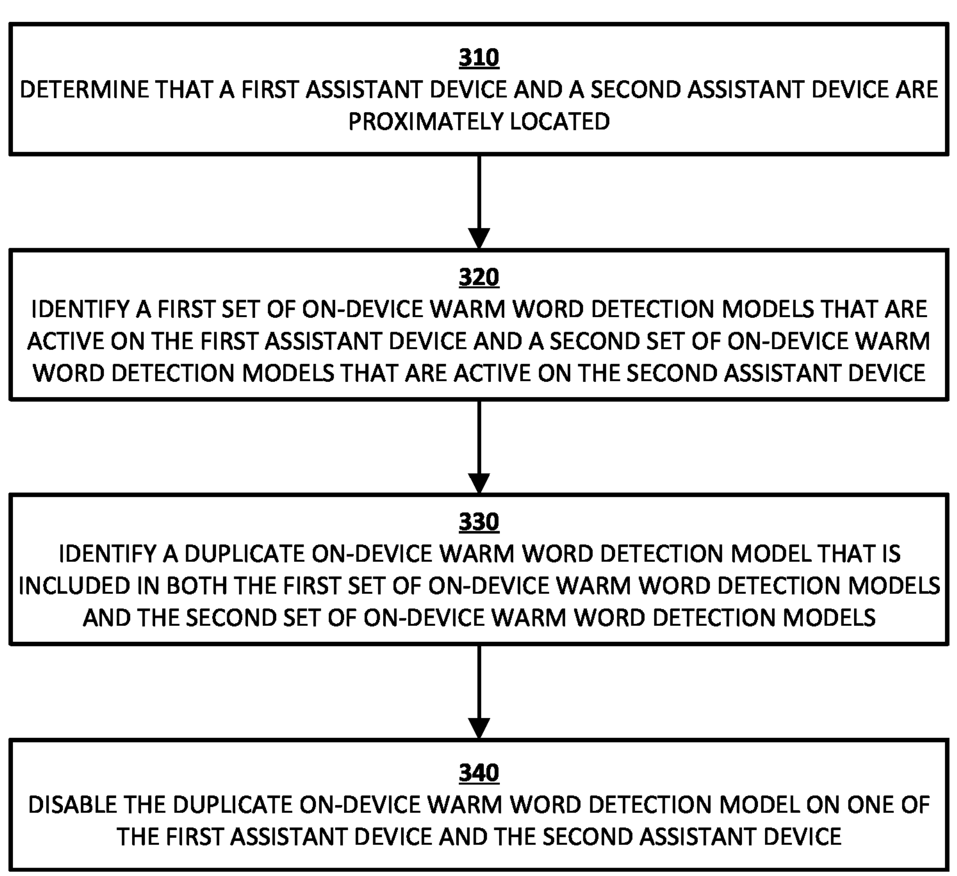

FIG. 3 is a flowchart illustrating an example method 300 for warm word arbitration between automated assistant devices, in accordance with implementations disclosed herein. For convenience, the operations of the flowchart are described with reference to a system that performs the operations. This system may include various components of various computer systems, such as one or more components of the assistant devices 110A-D. Moreover, while operations of method 300 are shown in a particular order, this is not meant to be limiting. One or more operations may be reordered, omitted, or added.

At block 310, the system determines that a first assistant device and a second assistant device are proximately located. In implementations, at block 310, cloud based assistant component(s) 140 determine that a first assistant device (e.g., assistant device 110A) and a second assistant device (e.g., assistant device 110B) are proximately located, based on the first assistant device and the second assistant device each detecting a same spoken utterance.

Still referring to block 310, in some implementations, assistant devices may be determined to be proximately located based on occurrence(s) of detecting the same spoken utterance(s) with at least a threshold "loudness" and/or with a threshold signal-to-noise (SNR) ratio, and the loudness and/or SNR ratio between the assistant devices being similar for occurrence(s). In other words, two or more assistant devices may be determined to be proximately located based on all of the assistant devices detecting the same spoken utterance(s) clearly. In other implementations, two or more assistant devices may be determined to be proximately located based on being assigned to the same room in a home graph. In yet other implementations, a first assistant device may emit a sound via its speakers (optionally at an frequency that is inaudible to humans) and request that other assistant devices use their microphone(s) to listen for the sound and report back regarding whether the sound was detected and/or detected characteristics of the sound (e.g., loudness, SNR, timestamp of detection, etc.). This information regarding whether the sound was detected and/or detected characteristics of the sound may be used by the assistant device to determine which assistant devices are proximately located. In yet other implementations, near field communication (NFC) may be used to determine which assistant devices are proximately located.

At block 320, the system identifies a first set of on-device warm word detection models that are active on the first assistant device and a second set of on-device warm word detection models that are active on the second assistant device. In implementations, at block 320, cloud based assistant component(s) 140 identify a first set of on-device warm word detection models (e.g., on-device warm word(s) models 137A1) that are active on the first assistant device (e.g., assistant device 110A) and a second set of on-device warm word detection models (e.g., on-device warm word(s) models 137B1) that are active on the second assistant device (e.g., assistant device 110B), the first assistant device and the second assistant device having been determined to be proximately located at block 310.

At block 330, the system identifies a duplicate on-device warm word detection model that is included in both the first set of on-device warm word detection models and the second set of on-device warm word detection models. In implementations, at block 330, cloud based assistant component(s) 140 identify a duplicate on-device warm word detection model that is included in both the first set of on-device warm word detection models (e.g., on-device warm word(s) models 137A1) and the second set of on-device warm word detection models (e.g., on-device warm word(s) models 137B1).

Still referring to block 330, in some implementations, for each of the first assistant device and the second assistant device, the system identifies an affinity score for a warm word associated with the duplicate on-device warm word detection model. In some implementations, the affinity score for the warm word associated with the duplicate on-device warm word detection model is determined based on a frequency of detection of the warm word. In other implementations, the affinity score for the warm word associated with the duplicate on-device warm word detection model is determined based on a time when the warm word was most recently detected.

At block 340, the system disables the duplicate on-device warm word detection model on one of the first assistant device and the second assistant device, in response to identifying the duplicate on-device warm word detection model and based on the first assistant device and the second assistant device being determined to be proximately located. In implementations, at block 340, cloud based assistant component(s) 140 disable the duplicate on-device warm word detection model identified at block 330 on one of the first assistant device (e.g., assistant device 110A) and the second assistant device (e.g., assistant device 110B), in response to identifying the duplicate on-device warm word detection mode at block 330 and based on the first assistant device and the second assistant device being determined to be proximately located at block 310.

Figure 4:
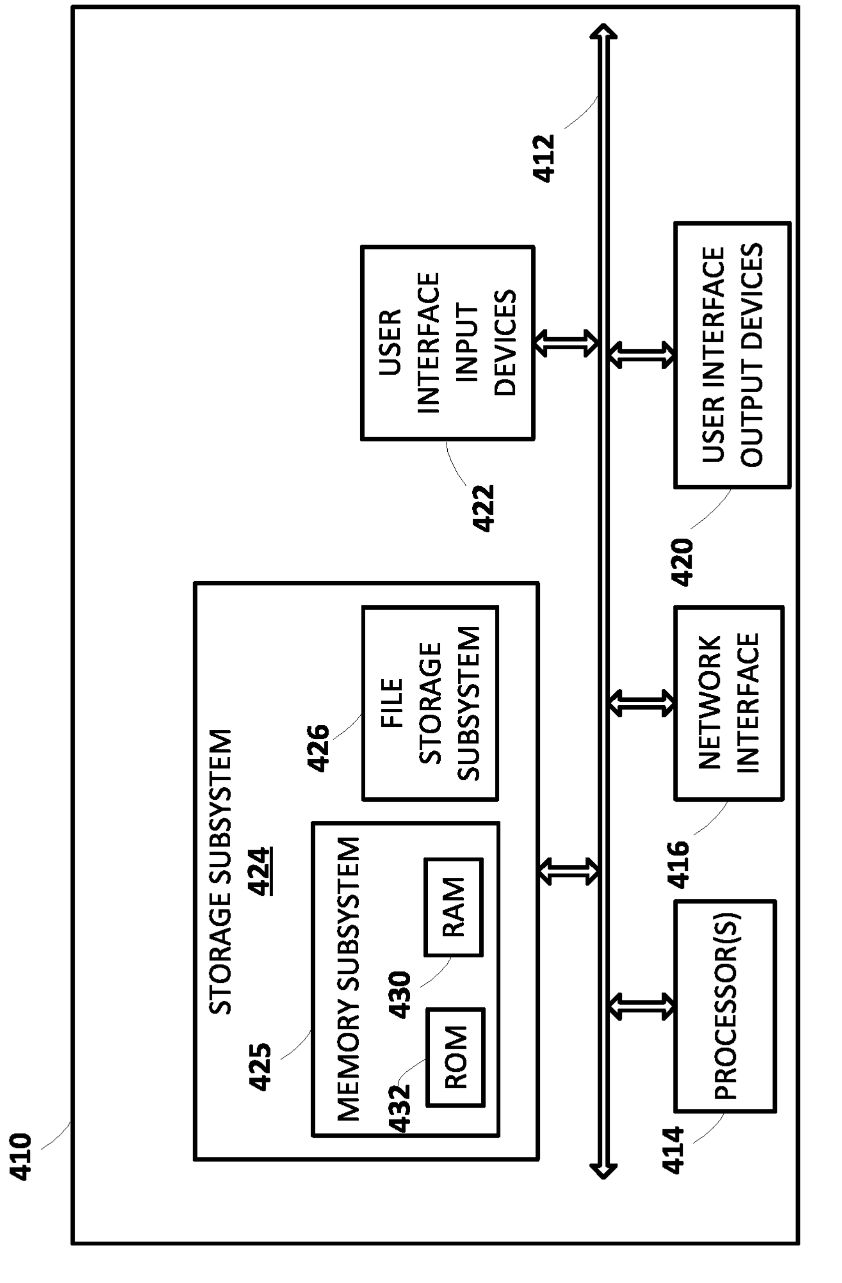
FIG. 4 depicts an example architecture of a computing device.

FIG. 4 is a block diagram of an example computing device 410 that may optionally be utilized to perform one or more aspects of techniques described herein. In some implementations, one or more of a client device, cloud-based automated assistant component(s), and/or other component (s) may comprise one or more components of the example computing device 410.

Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods disclosed herein, as well as to implement various components depicted in FIG. 1.

These software modules are generally executed by processor 414 alone or in combination with other processors. The memory subsystem 425 included in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

identifying a first set of on-device warm word detection models that are active on a first assistant device and a second set of on-device warm word detection models that are active on a second assistant device;

determining that the first assistant device and the second assistant device are proximately located;

identifying a duplicate on-device warm word detection model that is included in both the first set of on-device warm word detection models and the second set of on-device warm word detection models; and disabling the duplicate on-device warm word detection model on one of the first assistant device and the second assistant device, in response to identifying the duplicate on-device warm word detection model and based on the first assistant device and the second assistant device being determined to be proximately located.

2. The method according to claim 1, further comprising:

for each of the first assistant device and the second assistant device, identifying an affinity score for a warm word associated with the duplicate on-device warm word detection model, wherein disabling the duplicate on-device warm word detection model on one of the first assistant device and the second assistant device is further based on the affinity scores.

3. The method according to claim 2, wherein the affinity score for the warm word associated with the duplicate on-device warm word detection model is determined based on a frequency of detection of the warm word.

4. The method according to claim 1, wherein disabling the duplicate on-device warm word detection model on one of the first assistant device and the second assistant device comprises causing unloading of the duplicate on-device warm word detection model from memory of the one of the first assistant device and the second assistant device.

5. The method according to claim 1, wherein disabling the duplicate on-device warm word detection model on one of the first assistant device and the second assistant device comprises causing deleting of the duplicate on-device warm word detection model from storage of the one of the first assistant device and the second assistant device.

6. The method according to claim 1, wherein determining that the first assistant device and the second assistant device are proximately located is based on one or more occurrences of the first assistant device and the second assistant device each detecting a same spoken utterance.

7. The method according to claim 6, wherein determining that the first assistant device and the second assistant device are proximately located is based on one or more occurrences of the first assistant device and the second assistant device each detecting the same spoken utterance with at least a threshold loudness and/or with at least a threshold signal-to-noise (SNR) ratio.

8. The method according to claim 1, wherein determining that the first assistant device and the second assistant device are proximately located is based on the first assistant device and the second assistant device being assigned to the same room in a home graph.

9. The method according to claim 1, wherein determining that the first assistant device and the second assistant device are proximately located is based on detected characteristics, as detected by the first assistant device, of a sound that is emitted by the second assistant device.

10. The method according to claim 1, wherein determining that the first assistant device and the second assistant device are proximately located is based on near field communication.

11. The method according to claim 1, further comprising:

in response to disabling the duplicate on-device warm word detection model by the first assistant device, enabling a new warm word to an active set of warm words for the first assistant device.

12. The method according to claim 11, wherein enabling the new warm word to the active set of warm words comprises enabling detection of the new warm word by causing a new warm word model to be loaded into memory of the first assistant device.

13. The method according to claim 12, wherein the new warm word model is loaded into memory from storage of the first assistant device.

14. A system comprising:

one or more computer-readable storage media storing instructions;

one or more processors operable to execute the instructions to:

identify a first set of on-device warm word detection models that are active on a first assistant device and a second set of on-device warm word detection models that are active on a second assistant device;

determine that the first assistant device and the second assistant device are proximately located;

identify a duplicate on-device warm word detection model that is included in both the first set of on-device warm word detection models and the second set of on-device warm word detection models; and disable the duplicate on-device warm word detection model on one of the first assistant device and the second assistant device, in response to identifying the duplicate on-device warm word detection model and based on the first assistant device and the second assistant device being determined to be proximately located.

15. The system according to claim 14, wherein in disabling the duplicate on-device warm word detection model on one of the first assistant device and the second assistant device one or more of the processors are to cause unloading of the duplicate on-device warm word detection model from memory of the one of the first assistant device and the second assistant device.

16. The system according to claim 14, wherein in disabling the duplicate on-device warm word detection model on one of the first assistant device and the second assistant device one or more of the processors are to cause deleting of the duplicate on-device warm word detection model from storage of the one of the first assistant device and the second assistant device.

17. The system according to claim 14, wherein in determining that the first assistant device and the second assistant device are proximately located one or more of the processors are to determine that the first assistant device and the second assistant device are proximately located based on one or more occurrences of the first assistant device and the second assistant device each detecting a same spoken utterance.

18. The system according to claim 14, wherein in determining that the first assistant device and the second assistant device are proximately located one or more of the processors are to determine that the first assistant device and the second assistant device are proximately located based on the first assistant device and the second assistant device being assigned to the same room in a home graph.

19. The system according to claim 14, wherein in determining that the first assistant device and the second assistant device are proximately located one or more of the processors are to determine that the first assistant device and the second assistant device are proximately located on detected characteristics, as detected by the first assistant device, of a sound that is emitted by the second assistant device.

20. The system according to claim 14, wherein one or more of the processors are further operable to execute the instructions to:

in response to disabling the duplicate on-device warm word detection model by the first assistant device, enable a new warm word to an active set of warm words for the first assistant device.

* * * * *